July 30, 1935. L. NORDMANN 2,009,944
PROCESS OF TREATING BAST FIBER
Original Filed Sept. 14, 1932
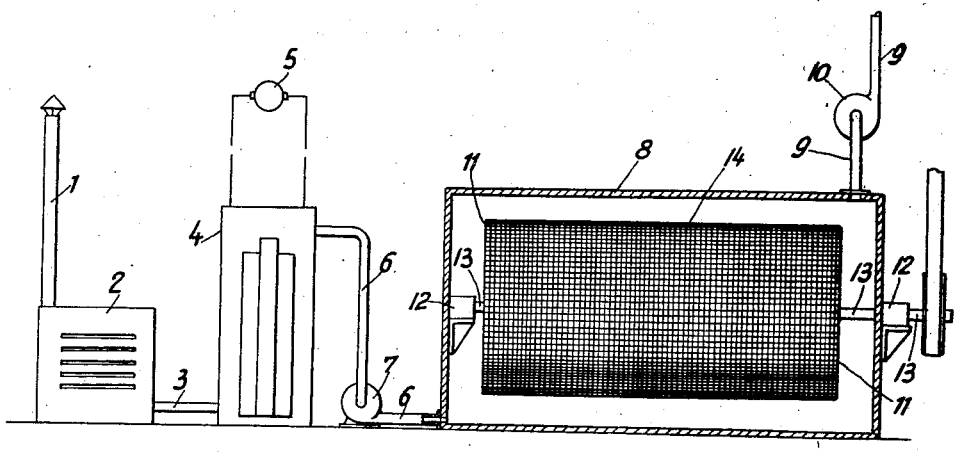
Leo Nordmann
Inventor
by [signature]
Attorney.

UNITED STATES PATENT OFFICE 2,009,944

PROCESS OF TREATING BAST FIBER

Leo Nordmann, Berlin, Germany

Application September 14, 1932, Serial No. 633,162
Renewed May 28, 1935. In Germany September 21, 1931

5 Claims. (Cl. 92—10)

This invention relates to a novel process of treating bast fiber plants for instance such as flax straw and the like with a view of obtaining therefrom the wooden parts as well as the fibrous matter and the foreign bodies, such as waxes and incrustations. My invention consists essentially therein that I cause the said parts and foreign bodies which are naturally contained in the fiber to undergo a change and that I remove said parts and foreign bodies by separating the same from the natural structure of the fiber.

My invention is based on the discovery that it is possible to effectively bring about the aforementioned change of the fibrous parts and the foreign bodies and their removal from the fiber without the use of water or moisture, by exposing the bast fiber plants in air-dry or dry condition to the action of an ionized current of air, that is a current of air which had been subjected to the action of a high tension electric current. Ionization of the air will result in an activation of the oxygen contained therein and in addition in the formation of nitrous oxides which act very effectively. I have further found that it will be necessary in this case to keep the ionized air during treatment of the fiber in permanent motion with respect to the fiber or vice versa. Accordingly, I arrange the treatment chamber for the bast fiber preferably in a manner to permit either a motion of said treatment chamber or of the fiber contained therein, or motion of both, said chamber and said fiber.

I have found that it is of advantage to break up the bast fiber plants prior to treatment in the treatment chamber by means of known breaking machines or the like for the purpose of rendering said fiber which is in dry condition to a higher degree accessible to the action of the ionized air.

I have further found that it is preferable to vary the temperature of the ionized air supplied to the fiber during treatment in the drum, for instance by temporarily lowering said temperature. In consequence of this variation or temporary reduction of temperature the wax-skin of the bast fiber plants will be caused to burst, thus permitting the ionized air to act more effectively upon the interior of said fiber.

A novel and peculiar feature of my invention is the possibility of successfully carrying out the treatment process in dry condition of the bast fiber throughout. This is in contrast to all heretofore known or used roasting processes in which the fiber is wetted or sprayed with water or in which the treated fiber contains water as a natural constituent.

The following may serve as an example of carrying out the process which forms part of my present invention.

Air-dry flax-straw in slightly broken condition is placed into a closed treatment chamber which is kept in motion. First, the flax-straw is slightly dried with warm air and thereupon treated for about one hour with moving ionized air supplied to the treatment chamber from a cooler through an ionizer An apparatus which may be used for carrying out my invention is shown in the accompanying drawing in a diagrammatic view, partly in section. The apparatus shown in the drawing comprises a pipe 1 through which atmospheric air is supplied to a cooler 2 by means of which the temperature may be decreased as far as to about 2° C. The air is carried from the cooler 2 through a pipe conduit 3 into the ionizer 4 which is supplied with electric current from the high tension mains 5. The ionized air is pressed through the conduit 6 by means of a fan 7 and supplied to the treatment chamber 8 from which the air after having acted upon the bast fiber is carried towards the outside through the conduit 9 by means of the fan 10.

Within the treatment chamber there is provided a drum 11 on a shaft 13 rotatably within the bearings 12. The wall of the drum is perforated to permit entrance of air and for this purpose said wall consists preferably of a wire netting 14 or the like. The bast fiber to be treated, for instance flax-straw, is placed within said drum. The shaft 13 of the drum 11 which extends through the wall of the treatment chamber permits said drum to be revolved from the outside of said chamber. In this manner the bast fiber to be treated in the drum 11 may be moved within the current of air passing through the perforated walls of the drum and the bast fiber contained therein.

After treatment the bast fiber is separated by means of known machinery and divided up into the aforementioned parts and foreign bodies. The treatment process described herein is destined to do away with the usual wet roasting process.

As a result of my present process it will be possible to obtain a fully integral, soft and flexible light-colored fiber of great tearing strength at the same time avoiding practically almost any losses of fibrous matter, when using a wet roasting process.

The process forming part of my present invention furthermore permits to obtain valuable by-products such as the wooden parts which may conveniently be worked into cellulose as well as the waxes and incrustations which may be industrially utilized for making finishing materials, pressed wall papers and the like. This is a further valuable advantage of my new process as compared with known processes for opening and utilizing bast fiber inasmuch as all known processes of treating bast fiber are based on destruction of all of its parts and constituents with the exception of the fibrous matter.

I claim:

1. A process of treating bast fiber plants for instance such as flax straw and the like for obtaining therefrom the wooden parts, the fibrous matter, the waxes as well as the incrustations, said process consisting in exposing said bast fiber in air-dry and eventually dry condition to the action of ionized air and in keeping said bast fiber and said ionized air in motion relatively to each other.

2. A process as specified by claim 1 in which process the temperature of the ionized air is temporarily decreased during treatment of the bast fiber.

3. The process of treating bast fiber plants, for instance such as flax straw and the like, for obtaining therefrom the wooden parts, the fibrous matter, the waxes, as well as the incrustations, said process comprising introducing the plants into a closed space, keeping them in motion therein, subjecting them during that time to the action first of hot air and then of cool ionized air, removing the plants from said space, and separating outside the same the fibres from the foreign bodies, substantially as set forth.

4. The process of treating bast fiber plants, for instance such as flax straw and the like, for obtaining therefrom the wooden parts, the fibrous matter, the waxes, as well as the incrustations, said process comprising introducing the plants in air-dry state and in slightly broken condition into a closed space, keeping them in motion therein and subjecting them during that time first to the action of hot air for such a period of time as is requisite to dry them completely, and then for about one hour to the action of cool ionized air, removing the plants from said space, and separating outside the same the fibres from the foreign bodies, substantially as set forth.

5. The process of treating flax straw for obtaining therefrom the wooden parts, the fibrous matter, the waxes, as well as the incrustations, said process comprising breaking the flax straw in air-dry state into pieces, introducing the pieces into a closed space, keeping them in motion therein and subjecting them during that time first to the action of hot air for such a period of time as is requisite to dry them completely, and then for about one hour to the action of cool ionized air, removing the flax straw from said space, and separating outside the same the fibres from the foreign bodies, substantially as set forth.

LEO NORDMANN.